United States Patent
Marchal et al.

(10) Patent No.: US 12,552,122 B2
(45) Date of Patent: Feb. 17, 2026

(54) METHOD FOR PRODUCING COMPOSITE BLADE CLEATS FOR AN AIRCRAFT TURBINE ENGINE

(71) Applicant: SAFRAN, Paris (FR)

(72) Inventors: Yann Didier Simon Marchal, Moissy-Cramayel (FR); Dominique Marie Christian Coupe, Moissy-Cramayel (FR); Damien Vincent Le Cloarec, Moissy-Cramayel (FR)

(73) Assignee: SAFRAN, Paris (FR)

( * ) Notice: Subject to any disclaimer, the term of this patent is extended or adjusted under 35 U.S.C. 154(b) by 113 days.

(21) Appl. No.: 18/707,138

(22) PCT Filed: Oct. 20, 2022

(86) PCT No.: PCT/FR2022/051988
§ 371 (c)(1),
(2) Date: May 2, 2024

(87) PCT Pub. No.: WO2023/079224
PCT Pub. Date: May 11, 2023

(65) Prior Publication Data
US 2025/0018673 A1  Jan. 16, 2025

(30) Foreign Application Priority Data
Nov. 3, 2021 (FR) ...................... 2111649

(51) Int. Cl.
*B29D 99/00* (2010.01)
*B29B 11/16* (2006.01)
(Continued)

(52) U.S. Cl.
CPC .......... *B29D 99/0025* (2013.01); *B29B 11/16* (2013.01); *B29C 70/545* (2013.01);
(Continued)

(58) Field of Classification Search
CPC ..... B29B 11/16; B29D 99/0025; B29C 70/68; B29C 70/682; B29K 2105/06
See application file for complete search history.

(56) References Cited

U.S. PATENT DOCUMENTS

2002/0197448 A1  12/2002  Booher
2020/0198185 A1*  6/2020  Hirabayashi ............ B29C 43/56

FOREIGN PATENT DOCUMENTS

DE   102014213294 A1  1/2016
FR       2718802 A1  10/1995
(Continued)

OTHER PUBLICATIONS

Search Report for Application FR2111649. 2022 . Accessed via The National Institute of Inudstrial Property Patent Database on Oct. 10, 2025. <https://data.inpi.fr/recherche_avancee/brevets>. 7 pages. (Year: 2022).*

(Continued)

*Primary Examiner* — John J DeRusso
*Assistant Examiner* — Alexander D Booth
(74) *Attorney, Agent, or Firm* — Bookoff McAndrews, PLLC

(57) ABSTRACT

Method for manufacturing composite blade cleats for an aircraft turbine engine, including providing a woven panel, including a plurality of cleat preforms each having a usable portion and at least one margin, the preforms being distributed in the panel so that two adjacent preforms have at least a portion of the margin in common; injecting a matrix onto the panel; after injection, dividing the panel in order to separate the cleats from one another; machining the cleats to remove the margins.

10 Claims, 3 Drawing Sheets

(51) Int. Cl.
   *B29C 70/54* (2006.01)
   *B29C 70/68* (2006.01)
(52) U.S. Cl.
   CPC ............ *B29C 70/68* (2013.01); *B29C 70/682* (2013.01); *B29K 2713/00* (2013.01)

(56) References Cited

FOREIGN PATENT DOCUMENTS

| | | |
|---|---|---|
| FR | 2939130 A1 | 6/2010 |
| WO | 2006136755 A2 | 12/2006 |

OTHER PUBLICATIONS

French Search Report for French Application No. 2111649 issued May 24, 2022 (7 pages).
International Search Report for International Application No. PCT/FR2022/051988 issued Jan. 2, 2023 (3 pages).

* cited by examiner

[Fig. 1]
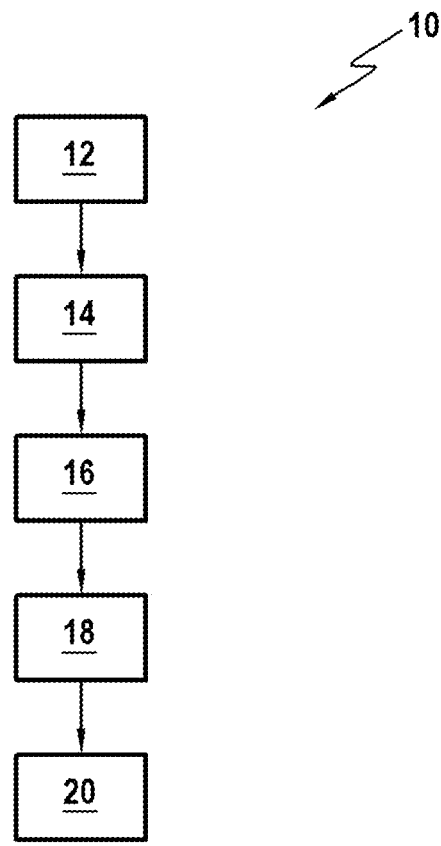
[Fig. 2]
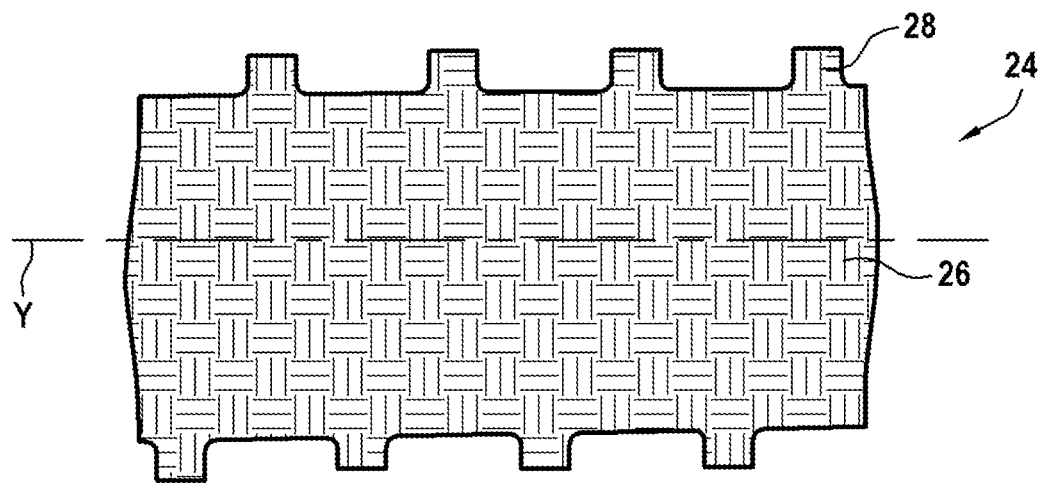

[Fig. 3]
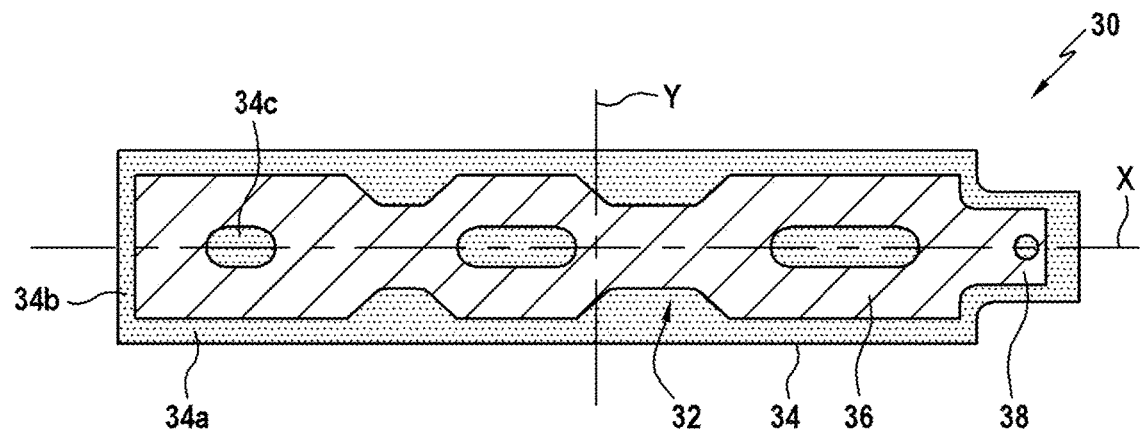
[Fig. 4]
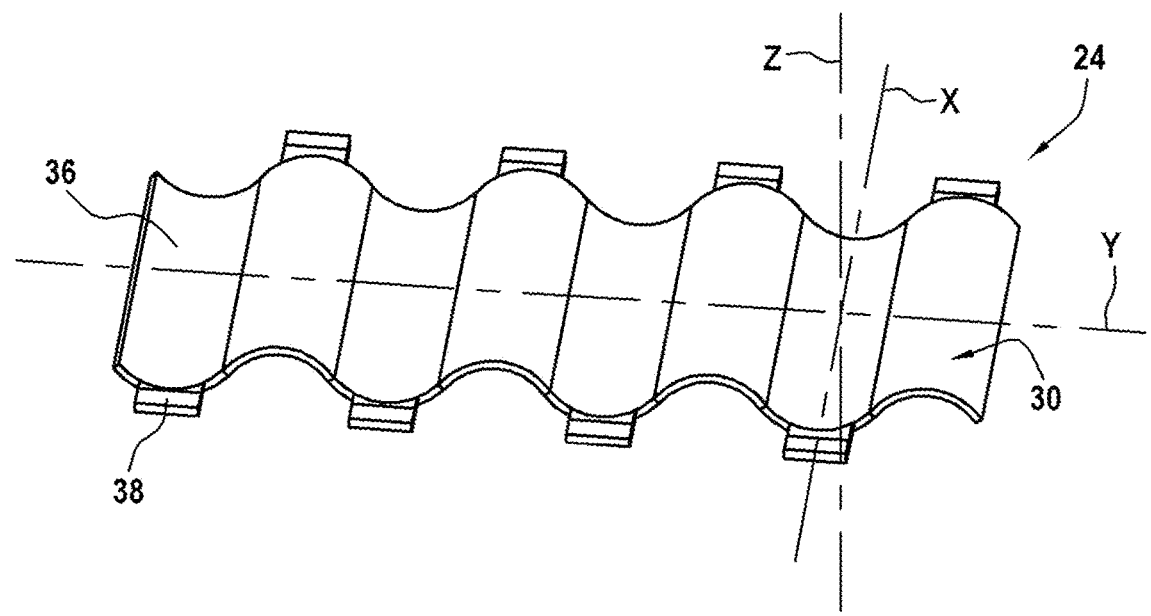

[Fig. 5]
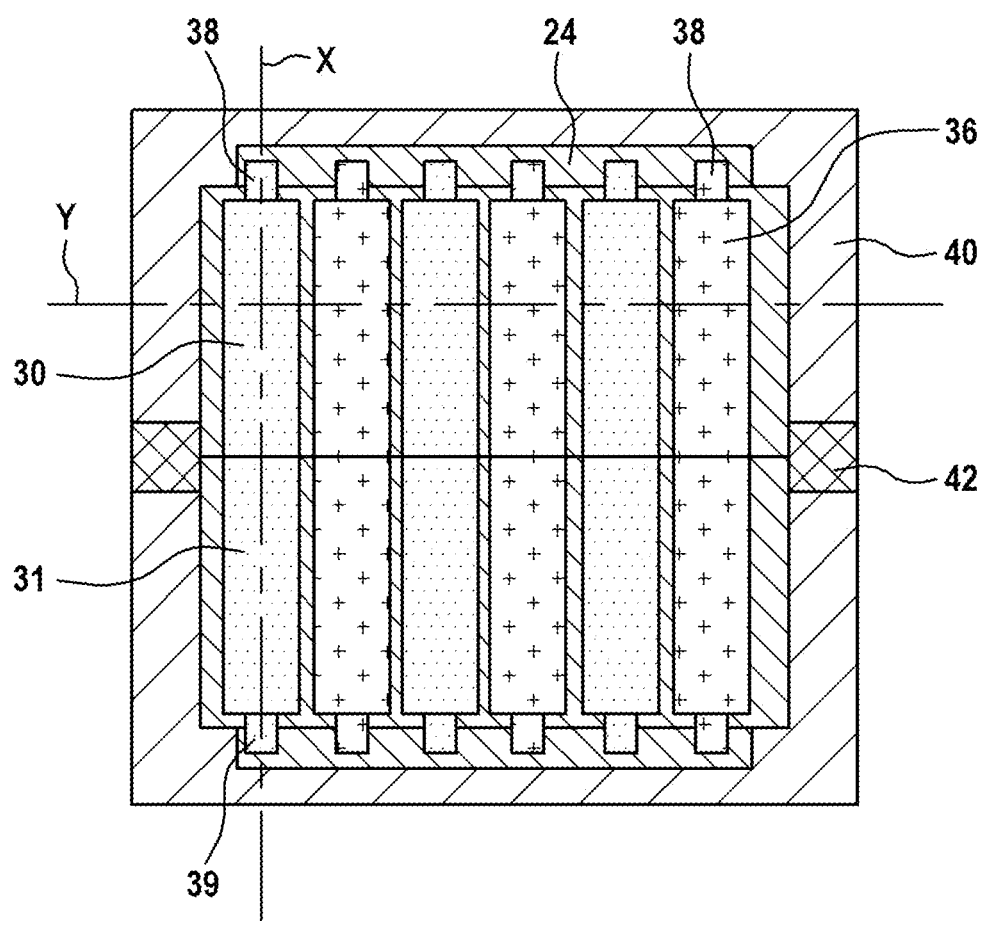

METHOD FOR PRODUCING COMPOSITE BLADE CLEATS FOR AN AIRCRAFT TURBINE ENGINE

CROSS-REFERENCE TO RELATED APPLICATIONS

This is a National Stage Application under 35 U.S.C. § 371 of International Application No. PCT/FR2022051988, filed Oct. 20, 2022, now published as WO 2023/079224 A1, which claims priority to French Patent Application No. 2111649, filed on Nov. 3, 2021, the entireties of which are incorporated herein by reference.

TECHNICAL FIELD

The present disclosure relates to the field of aeronautics, and particularly the field of composite parts used in aircraft turbine engines. In particular, the present disclosure relates to a method for manufacturing blade cleats for an aircraft turbine engine.

PRIOR ART

In an aircraft gas turbine, the movable blades are typically assembled on the periphery of a central disk by inserting the blade roots into sockets of the disk provided for this purpose. A cleat is arranged between the blade root and the corresponding socket in order to properly retain the blade engaged in the disk.

Blade cleats, which can be of composite material, can be produced by cutting a cleat preform and injecting a matrix onto this preform. In order to ensure the quality of the cleat, the preform is not prepared to the exact dimensions of the cleat, but rather larger, in order to be able, after injection, to remove from it the rim which generally has undesirable edge effects. Nevertheless, material losses associated with a method of this type are significant, so that there exists a need for a new type of blade cleat manufacturing method for an aircraft turbine engine allowing these losses to be reduced without negatively affecting the quality of the cleats produced.

DISCLOSURE OF THE INVENTION

To this end, the present disclosure relates to a method for manufacturing composite blade cleats for an aircraft turbine engine, comprising:
  providing a woven panel comprising a plurality of cleat preforms each having a usable portion and at least one margin, the preforms being distributed in the panel so that two adjacent preforms have at least one portion of said margin in common;
  injecting a matrix onto the panel;
  after injection, dividing the panel in order to separate the cleats from one another;
  machining the cleats to remove the margins.

In the present method, the blade cleats are of composite material, independently of the material of the blades themselves.

The cleat preform is a portion of the woven panel. After injecting the matrix, this cleat preform (or more simply "preform"), associated with the matrix, forms a cleat. The margin of the cleat preform is initially found on the cleat itself (this is then designated the margin of the cleat), before being removed during the division of the panel and/or by machining.

The panel can comprise fibers which are woven together so as to ensure the mechanical resistance of the cleat. The panel can be made in a single piece.

Each cleat preform has a usable portion, which is the portion intended to form the cleat once completed, and at least one margin, the margin(s) being portions serving for manufacture but which are not present in the final cleat. Hereafter, and unless otherwise indicated, what is meant by "a" or "the" margin is "at least one" or "the at least one" or even "each" margin. Conversely, the generic use of the plural can include the singular.

The matrix, for example an organic matrix, can be injected onto the panel so as to at least partially embed the fibers of the cleat preforms. The injection of the matrix can be accomplished by any means known to a person skilled in the art. The fibers can be pre-impregnated, or not.

After injection of the matrix, and optionally after solidification of the matrix, the cleats are separated from one another. The separation can be accomplished, for example, at the margins.

During machining, the margins that remain are removed from each cleat, it being understood that a portion of the margins may already have been removed during the step of dividing the panel. Machining can be accomplished before, after and/or during the division of the panel.

Due to the fact that the preforms are distributed in the panel so that two adjacent preforms have at least one margin portion in common, the margins are at least partially shared: the same margin portion can serve for two adjacent preforms. Thus, instead of two margins which add to each other, the panel comprises one (at least partially) common margin. The portion of material, fibers and matrix, which is then removed, is therefore reduced. The result is not only an economy of material—potentially in the order of 50%—but also an economy in the use of the looms, because the quantity of margins to be woven per cleat preform is less than according to the method previously employed. The method is therefore more rapid and less costly. In addition, the margins being located between two preforms have no edge effect, so that they can have smaller dimensions than margins having edge effects. Finally, as the portion removed during machining is reduced, the mechanical stresses associated with this portion are also reduced, and the relaxation of stresses which appears in the cleat at the time of machining is therefore reduced. The cleats therefore have better geometric stability.

Conceptually, a margin in common between two preforms could be seen as the juxtaposition of two half-margins, each preform having its own half-margin which is not shared with the adjacent preform. Within the meaning of the present disclosure, the fact that two adjacent preforms have at least one margin portion in common signifies on the contrary that each preform has the benefit not only of its own half-margin (or more generally its own margin fraction), but also, at least partially, of the half-margin (or more generally the complementary margin fraction) of the adjacent preform. In other words, if the half-margin of the adjacent preform were removed, the manufacturing method would have poorer performance. Thus, a margin at least partially in common within the meaning of the present disclosure must in fact be considered as a unique but shared margin, and not a juxtaposition of independent half-margins.

In some embodiments, the cleat preforms are continuously woven with one another. Thus, some fibers extend continuously from one cleat preform to another cleat preform, perhaps, optionally, between the respective usable portions of said cleat preforms. Optionally, some fibers extend continuously from one cleat preform to another cleat preform via the at least partially common margin between these two preforms. This allows facilitating weaving but also reducing the necessary margins between two adjacent preforms, the edge effects being less present than when the preforms are woven independently of one another.

In some embodiments, the panel comprises a single row of cleat preforms. This offers more freedom for the arrangement and the orientation of the cleat preforms in the panel. In addition, this allows avoiding the complexity associated with a panel having several rows of cleat preforms and with a deformation resulting from it due to the potentially complex geometry of the cleats.

In some embodiments, after injection, the cleats have a curved cross section, the curvature of a given cleat being reversed relative to the curvature of an adjacent cleat. The curvature of a cleat designates the curvature of a cross section of the cleat. These arrangements allow good continuity of the fibers between two adjacent cleats and avoids, at the interface between the cleat preforms, folds and cusps which would be likely to affect the health of the material. More generally, the curvature of the cleats can be reversed from one cleat to another.

In some embodiments, the panel has, at least during injection, a shape that is corrugated in the direction of alignment of the cleat preforms. The cleat preforms being juxtaposed, the direction of alignment of the cleat preforms is the direction of the row formed by the successive cleat preforms. The corrugated shape can be formed by the succession of reversed curvatures previously described. The corrugated shape allows retaining a panel that is easy to handle and compatible with the usual injection molds.

Although the present disclosure considers the example of a rectilinear alignment of the cleat preforms, the direction of alignment can also be curved, for example if the preforms are arranged in a circle.

In some embodiments, the usable portion comprises a body and a narrowed head protruding longitudinally from the body. The longitudinal direction of the body can be the direction in which the body has the largest dimension. The head can be narrowed relative to the body transversely to the longitudinal direction.

In some embodiments, the two adjacent preforms are adjacent to one another in a first direction and each of the heads of the two adjacent preforms is located on a different side of the first direction. The first direction can be the alignment direction.

The alignment direction can be transverse to the longitudinal direction of the body, which allows sharing the longest margins (by definition of the longitudinal direction) between the successive preforms, and therefore maximizing the saving of material.

Due to the fact that each of the heads of the two adjacent preforms are located on a different size of the first direction, the two adjacent preforms are arranged in the panel so that their facing edges have a certain complementarity of two-dimensional, perhaps three-dimensional shape. As a result, the margins can be further reduced and the previously detailed savings are increased.

Within the meaning of the present disclosure and unless otherwise indicated, the mention of a "first" element, such as a first direction, does not necessarily imply the existence of a "second" element, nor, as the case may be, an ordered relation between the first and the second element. The ordinal qualifiers are, in this context, employed for the sole purpose of clarity and identification, without assuming particular features.

In some embodiments, the two adjacent preforms are adjacent to one another in a second direction, and the heads of the two adjacent preforms are located at opposite ends in the second direction. The second direction can be the longitudinal direction. In these embodiments, the cleat preforms can be facing one another at their side opposite to the head, and have respective heads which protrude opposite to one another. By juxtaposing such pairs of preforms transversely to the second direction, it is possible to form two rows of preforms and to process additional cleat preforms in a single step of injecting a matrix. The speed of manufacture is thereby increased.

In some embodiments, the providing panel comprises weaving a scrim and cutting of at least one panel in the scrim. The scrim is an object woven in a single piece. The scrim can comprise several panels. Each panel, corresponding to a set of cleat preforms, can then be the subject of a separate matrix injection.

In some embodiments, the panel is woven by three-dimensional weaving. What is meant by "three-dimensional weaving" is a weaving technique in which the weft yarns circulate within a matrix of warp yarns so as to form a three-dimensional network of yarns according to a three-dimensional weaving pattern: all the layers of yarns of a structure of this type are then woven during a single weaving step within a three-dimensional loom. Three-dimensional weaving is described in the international application WO 2006/136755 A2 by the Applicant. The yarns can be formed by the aforementioned fibers.

In some embodiments, the panel comprises yarns of different diameters. Yarns of different diameters allow creating variations in the thickness of the cleat preforms, and therefore of the resulting cleat, while limiting or avoiding variations of fiber ratios inside the cleat.

BRIEF DESCRIPTION OF THE DRAWINGS

Other features and advantages of the object of the present disclosure will be revealed by the following description of embodiments, given by way of non-limiting examples with reference to the appended figures.

FIG. 1 is a schematic illustrating the steps of a manufacturing method according to an embodiment.

FIG. 2 shows a panel in top view, according to an embodiment.

FIG. 3 shows a cleat preform in top view, according to an embodiment.

FIG. 4 is a perspective view of a panel after injection of the matrix, according to an embodiment.

FIG. 5 illustrates schematically the injection of resin onto a panel according to another embodiment.

DETAILED DESCRIPTION

A method for manufacturing composite blade cleats for an aircraft turbine engine is described with reference to FIGS. 1 to 5. As previously indicated, the composite cleat can be interposed between a blade, for example a fan blade, and a socket in which this blade is mounted.

FIG. 1 illustrates schematically the steps of a manufacturing method 10. The manufacturing method 10 comprises the provision of a woven panel, comprising a plurality of cleat preforms. In this particular case, providing the panel comprises weaving a scrim (step 12) and cutting at least one panel in said scrim (step 14). The panel, or the scrim from which the panel inherits properties, can be woven by three-dimensional fiber weaving. The fibers can be organic fibers, for example carbon fibers.

A panel 24 is illustrated schematically, in top view, in FIG. 2. As revealed by this figure, the panel 24 is made in a single piece. The panel 24 can have a shape corresponding overall to a juxtaposition of cleat preforms. In this particular case, the panel 24 comprises a central zone 26 intended to form the bodies of the cleats, and protrusions 28 intended to form the heads of cleats, which will be described hereafter. The protrusions 28 protrude from the central zone 26 alternately on either side of the central zone 26.

FIG. 3 illustrates more particularly a cleat preform 30 (also called a preform 30 for the sake of conciseness). The preform 30 extends in a longitudinal direction X overall.

As previously indicated, the preform 30 comprises a usable portion 32, cross-hatched in FIG. 3, and at least one margin 34. In this particular case, the usable portion 32 is surrounded by margins. The at least one margin 34 can comprise two longitudinal margins 34a extending in the longitudinal direction X, and/or two transverse margins 34b extending in the transverse direction Y.

The preform 30 can also comprise one or more internal margins 34c, corresponding to portions which will be perforated in the final cleat.

As revealed by FIGS. 2 and 3, the cleat preforms 30 can be continuously woven with one another. Thus, at least some fibers extend continuously from one preform 30 to another, which allows easily weaving the panel 24 in a single piece, with no discontinuity of fibers between successive preforms 30. Moreover, FIG. 3 illustrates schematically that in the panel 24 itself, the boundary between two preforms 30 is not perceptible, even it were possible to virtually delimit the preforms 30. In other embodiments, the limit between two adjacent preforms 30 can be visually perceptible, particularly in the case where the weaving pattern changes at the interface between two preforms, and/or due to the fact of the presence of excessive lengths of fibers at the margins.

As previously mentioned, the usable portion 32 of the preform 30 comprises a body 36 and a head 38. The head 38 is narrowed relative to the body 36 and protrudes longitudinally from the body 36. It is noted in fact, in FIG. 3, that the head 38 is less wide than the body 36 in the transverse direction Y. The transverse margin 34b at the head 38 can follow the shape of the head 38.

As previously indicated, the preforms 30 are distributed in the panel 24 so that two adjacent preforms 30 have at least a margin portion in common. In this particular case, the adjacent preforms 30 can be located in the panel 24 so as to share at least partially the same longitudinal margin 34a. Thus, as illustrated in FIG. 2, the preforms 30 can be located side by side, which is visible due to the fact that the protrusions 28, intended to form the heads 38, follow one another in the transverse direction Y. In this embodiment, the panel 24 therefore comprises a single row of cleat preforms 30.

In this example, the preforms 30 are adjacent to one another in a first direction, namely the transverse direction Y, and each of the heads 38 of the adjacent preforms 30 is located on a different side of the first direction, namely the transverse direction Y. Typically, given the orientation of FIG. 3, the first protrusion 28 starting from the left is located below the transverse direction Y (i.e. also on a first side of the central zone 26), while the following protrusion 28, going to the right, is located above the transverse direction Y (i.e. also on an opposite side of the central zone 26), and so on.

The panel 24 can be provided flat, as illustrated in FIG. 2. If necessary, the panel 24 can undergo forming and/or compacting in order to prepare it for the injection of a matrix.

A matrix is then injected onto the panel 24 (step 16 in FIG. 1), typically in a mold in which the panel 24 is placed. The matrix can comprise a resin or any other matrix suited to the intended use.

If necessary, the injected panel is then removed from the mold, and if needed deburring can be carried out.

FIG. 4 illustrates the result obtained after injection of the matrix onto the panel 24. The panel 24 has a shape that is corrugated in the direction of alignment of the cleat preforms, i.e. here in the transverse direction Y. More precisely, while passing along it progressively in the transverse direction Y (alignment direction), the panel 24 has corrugations the amplitude of which is measured on an axis Z transverse to the longitudinal direction X and to the transverse direction Y. Leaving out the corrugations, the panel 24 can be flat overall, i.e. have a constant average dimension along the axis Z. It should be noted that the axes X, Y, Z are orthogonal here, two by two.

This shape can be provided for as of the step 16 of injection of the matrix, for example due to the aforementioned forming step, and/or to a desired shape of the mold in which the injection can be carried out.

After injection, as shown in FIG. 4, the cleats have a curved cross section, the curvature of a given cleat being reversed relative to the curvature of an adjacent cleat. Thus, in FIG. 4, the first cleat starting from the left appears concave when seen from above, while the following cleat to the right appears convex when seen from above, and so on.

Variants in positioning cleat preforms 30 within the panel 24 are possible. For example, the preforms 30 can be arranged in not just one but two rows in the transverse direction Y. In this case, the rows can be arranged as in FIGS. 2 and 4, with the protrusions 28 forming the heads 38 arranged alternately on either side of the central zone 26. At the interface between the two rows, the protrusions 28 of one of the rows can occupy the empty spaces between two protrusions of the other row.

Another variant is shown schematically in FIG. 5. In this variant, the two rows are such that two adjacent preforms 30, 31 are adjacent to one another in a second direction, namely the longitudinal direction X, and the heads 38, 39 of the two adjacent preforms 30, 31 are located at opposite ends in the second direction, namely the longitudinal direction X. In other words, the two adjacent preforms 30, 31 are adjacent to one another on the side of their body 36 (opposite to their head): each preform 30, 31 has, at the interface with the other preform, its end opposite to the head.

As previously mentioned, such pairs of preforms can be juxtaposed, for example in the transverse direction Y. If necessary, the alternation of curvatures can be retained, as shown by FIG. 5 in which the points illustrate a concave side of the preform 30, while the crosses illustrate a convex side of the preform 30.

As two adjacent preforms in the transverse direction Y have their head 38 on the same side, it can be useful to provide for a longitudinal margin between two adjacent preforms that is larger than in the embodiment of FIG. 4, insofar as the arrangement of FIG. 5 cannot ensure as good a complementarity of shape between two preform 30 edges. It is nevertheless noted that the margin between two adjacent preforms remains narrower than the margins necessary at the ends of the panel 24, at the interface with the mold 40 in the transverse direction Y, these outer margins being due to the edge effects. This testifies to the saving that is still attained with this type of arrangement, inasmuch as this embodiment allows reducing declines at the heads 38.

The matrix injection can be accomplished via a feed channel 42 provided in the mold 40. The mold 40 forms a single cavity for the entire panel 24. What is signified by single cavity is that the mold 40 does not form a separation between the adjacent preforms 30 in the alignment direction(s) of the preforms 30.

Again with reference to FIG. 1, after the injection step 16, the manufacturing method 10 comprises the division of the panel 24 in order to separate the cleats from one another. For example, this division can be accomplished along the intermediate lines illustrated in FIG. 4.

A machining step 20 is provided for removing the margins 34 of the cleats, it being understood that the elimination of the margins 34 can have taken place partially during the division of the panel 24. The remainder of the machining can take place prior to the division of the panel 24, for example for disengaging the heads 38, which allows handling a single-piece part, and/or after the division of the panel 24, for example for machining the zones which are located between two cleats.

Optionally, visual and/or instrumented checks can be carried out at several instants of the manufacturing method, and particularly after machining.

Although the present description refers to specific exemplary embodiments, modifications can be applied to these examples without departing from the general scope of the invention as defined by the claims. In addition, individual features of the different embodiments illustrated or mentioned can be combined into additional embodiments. Consequently, the description and the drawings should be considered in an illustrative, rather than in a restrictive sense.

The invention claimed is:

1. A method for manufacturing composite blade cleats for an aircraft turbine engine, comprising:
providing a panel, the panel being woven and comprising a plurality of cleat preforms each having a usable portion and at least one margin, the preforms being distributed in the panel so that two adjacent preforms have at least one portion of said margin in common;
injecting a matrix onto the panel;
after injection, dividing the panel in order to separate the cleats from one another;
machining the cleats to remove the margins;
wherein, after the injection, the cleats have a curved cross section, the curvature of a given cleat being reversed relative to the curvature of an adjacent cleat.

2. The manufacturing method according to claim 1, wherein the cleat preforms are continuously woven with one another.

3. The manufacturing method according to claim 1, wherein the panel comprises a single row of cleat preforms.

4. The manufacturing method according to claim 1, wherein the panel has, at least during injection, a shape that is corrugated in an alignment direction of the cleat preforms.

5. The manufacturing method according to claim 1, wherein the usable portion comprises a body and a narrowed head protruding longitudinally from the body.

6. The manufacturing method according to claim 5, wherein the two adjacent preforms are adjacent to one another in a first direction and each of the heads of the two adjacent preforms is located on a different side of the first direction.

7. The manufacturing method according to claim 5, wherein the two adjacent preforms are adjacent to one another in a second direction and the heads of the two adjacent preforms are located at opposite ends in the second direction.

8. The manufacturing method according to claim 1, wherein the providing the panel comprises weaving a scrim and cutting of at least one panel in the scrim.

9. The manufacturing method according to claim 1, wherein the panel is woven by three-dimensional weaving.

10. The manufacturing method according to claim 1, wherein the panel comprises yarns of different diameters.

\* \* \* \* \*